United States Patent
Miller

(10) Patent No.: US 7,266,708 B2
(45) Date of Patent: Sep. 4, 2007

(54) SYSTEM FOR IDLING A PROCESSOR PIPELINE WHEREIN THE FETCH STAGE COMPRISES A MULTIPLEXER FOR OUTPUTTING NOP THAT FORWARDS AN IDLE SIGNAL THROUGH THE PIPELINE

(75) Inventor: William V. Miller, Arlington, TX (US)

(73) Assignee: VIA Technologies, Inc., Taipei (TW)

( * ) Notice: Subject to any disclaimer, the term of this patent is extended or adjusted under 35 U.S.C. 154(b) by 413 days.

(21) Appl. No.: 10/963,159

(22) Filed: Oct. 12, 2004

(65) Prior Publication Data
US 2006/0080560 A1    Apr. 13, 2006

(51) Int. Cl.
*G06F 1/00* (2006.01)
(52) U.S. Cl. .................. 713/300; 713/320; 710/59
(58) Field of Classification Search ................ 713/300, 713/320; 710/59
See application file for complete search history.

(56) References Cited

U.S. PATENT DOCUMENTS

| | | | |
|---|---|---|---|
| 6,247,134 B1* | 6/2001 | Sproch et al. | 713/320 |
| 6,636,976 B1* | 10/2003 | Grochowski et al. | 713/320 |
| 2003/0070013 A1* | 4/2003 | Hansson | 710/59 |

* cited by examiner

*Primary Examiner*—Thomas Lee
*Assistant Examiner*—Sean Weinman
(74) *Attorney, Agent, or Firm*—Thomas, Kayden, Horstemeyer & Risley

(57) ABSTRACT

A processor disclosed herein comprises a clock configured to drive clock signals and a processor pipeline having a plurality of stages. The processor includes processor idling circuitry, which is configured within the stages and is responsive to an idle_request signal. A first stage comprises a device for stopping incoming instruction values from being further processed when the idle_request signal is received. Also, at least two of the remaining stages comprise idle_flag logic configured to receive the idle_request signal, the idle_flag logic further configured to transmit an idle_flag through the processor pipeline.

27 Claims, 3 Drawing Sheets

SYSTEM FOR IDLING A PROCESSOR PIPELINE WHEREIN THE FETCH STAGE COMPRISES A MULTIPLEXER FOR OUTPUTTING NOP THAT FORWARDS AN IDLE SIGNAL THROUGH THE PIPELINE

BACKGROUND

Regarding electronic devices, particularly battery-operated hand-held devices that utilize a processor, the issue of power consumption is a concern that is considered during the design phase of the device. Since a processor's clock typically consumes a relatively large amount of battery power, it is well known to design the electronic devices such that the clock can be shut off during extended periods of inactivity. Prior to stopping the clock, however, power management logic usually requests that the processor enter an "idle" state in which the processor does not perform further bus accesses or other processing operations. When the processor is idle, the power management logic can then safely stop the clock.

Not only does shutting down the clock conserve battery power, but it also allows heat to be properly dissipated from the electronic device. Since a processor often operates on non-critical instructions, such as "loop to self" instructions, it may be beneficial to design a device with processor idling circuitry to avoid unnecessary processor usage that will invariably produce heat. In some cases, cutting unnecessary usage time can reduce the production of heat to such a degree that the device can be designed to operate without the use of a fan, thereby allowing the size and cost of a device to be reduced. Also, with adequate heat dissipation, hand-held devices are less likely to overheat or become too warm to the touch. Another advantage in this regard is that less expensive packaging may be used when heat is properly controlled.

FIG. 1 illustrates a conventional processing system 10 of an electronic device, such as a battery-operated hand-held device. The processing system 10 includes power management logic 12, a processor 14, memory 16, and input/output devices 18, each interconnected via an internal bus 20. The processor 14 includes a clock 22 for driving the electrical circuitry as is well known. The memory 16 may include a memory controller and other hardware and/or software elements. The input/output devices 18 may include keyboards, keypads, display screens, etc. Since one of ordinary skill in the art will understand the operation and function of the memory 16 and input/output devices 18, these components will not be further described in this disclosure.

The power management logic 12 may include hardware and/or software elements for determining specific circuit conditions that might be ideal times when automatic power-saving measures can be taken. For example, the power management logic 12 may monitor when the processor has not been working on any critical instructions for a predetermined length of time or monitor periods of user inactivity or other specific circuit conditions. In these situations, the power management logic 12 can request that the processor 14 go to an idle condition. When the processor 14 is idle, the power management logic 12 can then disable the processor's clock 22. Later, when a wake-up event occurs, the power management logic can re-enable the clock 22.

FIG. 2 illustrates an embodiment of a conventional processor 14. The processor 14 contains a processor pipeline 24 configured in five stages, each stage uniquely handling the processing of data and interacting with the memory 16 and/or input/output devices 18 as needed. The stages of the pipeline 24 include a fetch stage 26, a decode stage 28, an execute stage 30, a memory access stage 32, and a write-back stage 34. Although a processor typically might have five stages representing five major operations of the processor, the stages can be divided or regrouped into any desirable configuration. It is well known in the art that other conventional processors may have fewer or more stages in its pipeline.

FIG. 2 also shows the processor's clock 22 connected to each stage of the pipeline 24 for feeding clock signals thereto. The clock 22 is also connected to receive an enable/disable signal from the power management logic 12. The processor 14 also contains an AND gate 36 having inputs connected to receive an "idle" signal from each stage and an output that feeds an "idle_acknowledge" signal back to the power management logic 12. In the fetch stage 26, an AND gate 38 is configured having a first input receiving an "idle_request" signal from the power management logic 12 and a second input receiving normal instruction requests along line 40 from within the fetch stage 26.

It should also be noted that each stage includes idle detection circuitry (not shown), which is unique to that stage for determining when the stage is idle. Once the idle detection circuitry of the fetch stage 26, for example, detects an idle condition when there are no instructions to fetch, it will send a high "idle" signal to one of the inputs of the AND gate 36. Also, the idle detection circuitry in each of the decode stage 28, execute stage 30, memory access stage 32, and write-back stage 34 will also eventually detect that they too are idle and independently send idle signals to the AND gate 36 as well. When idle signals are received from each stage, the AND gate 36 outputs a logic 1 idle_acknowledge signal. When the power management logic 12 receives the idle_acknowledge signal, it can then send a disable signal to the clock 22 to shut it down.

During normal operation of the processor 14, the power management logic 12 maintains the idle_request signal inactive (logic 0). The first input of the AND gate 38 inverts the inactive idle_request signal, i.e. not idle, and the second input receives the normal instruction requests from line 40. With idle_request inactive, the AND gate 38 outputs the normal instruction request along line 42 to fetch an instruction from memory 16. In response to a request for instructions, the memory 16 returns instruction values, e.g. from a software program, along line 44 back to the fetch stage 26. The fetched instruction values are sent to the decode stage 28, which decodes the signals and sends the decoded instructions to the execute stage 30. The execute stage 30 performs the instructions, and the memory access stage 32 and write-back stage 34 can read data from or write date to memory 16 and/or register files as necessary.

In order to conserve power during periods of inactivity, the power management logic 12 may decide to stop the clock 22, which, as mentioned above, requires that the processor stages be inactive or idle. To idle the processor, the power management logic 12 sends an active or high (logic 1) idle_request signal to the processor 14 to stop the fetch stage 26 from making more instruction fetch requests. The idle_request signal essentially disables the normal instruction requests along line 40 from being output from the AND gate 38. Consequently, requests for instructions are momentarily discontinued. It should be pointed out, however, that outstanding instruction requests, which may have been sent out from the processor 14 immediately before the idle_request was received, may still be traversing to or from memory 16. Because of this, the fetch stage 26 may still receive additional instruction values from memory 16 several clock cycles after receiving the idle_request signal. Eventually, however, the memory 16 will stop sending instruction values. At some time thereafter, idle detection circuitry of the fetch stage 26 will detect that no instructions are being received and will send out an idle signal to AND gate 36. The idle detection circuitry in the following stage will also eventually detect inactivity and likewise send an idle signal.

A disadvantage of the prior art approach to idling a processor pipeline is that each stage must decode its own idle state uniquely and as a result there is no consistency in the design of this feature in each processor pipeline stage. The lack of consistency adds to the risk of making a mistake in the design of the processor. For instance, the execute stage must include logic to detect that each of its parts, e.g. multiplier, arithmetic unit, add/subtract unit, shifter, logical unit, etc., are all idle to determine if the whole stage is idle. If the designer of the execute stage accidentally designs the idle detection circuitry without checking one of these parts, then a circuit condition that should rightly indicate activity may be missed. Just one of a multitude of possible idle conditions not being accounted for could result in an improper processor idle indication. With many circuit conditions to consider in order to idle the processor, the chances of design error will only increase as processor complexity increases. Therefore, a need exists to simplify the processor idle detection circuitry to provide a more consistent approach for idling the processor.

SUMMARY

The present application is directed to systems and methods for idling a processor. In one embodiment, a processor comprises a clock configured to drive clock signals and a pipeline having a plurality of stages. The processor further comprises processor idling circuitry configured within the stages, the processor idling circuitry responding to an idle_request signal. A first stage comprises a device for stopping incoming instruction values from being further processed when the idle_request signal is received. Also, at least two of the remaining stages comprise idle_flag logic configured to receive the idle_request signal, the idle_flag logic further configured to transmit an idle flag through the pipeline.

One embodiment of a method for idling a processor, which has a plurality of stages, comprises receiving an idle_request from power management logic. The method also includes blocking instruction values received from memory and propagating a "no-operation" signal through the stages of the processor. The method also propagates an idle_flag in parallel with the no-operation signal through the stages of the processor.

BRIEF DESCRIPTION OF THE DRAWINGS

Many aspects of the embodiments of the present disclosure can be better understood with reference to the following drawings. It can be noted that like reference numerals designate corresponding parts throughout the drawings.

DETAILED DESCRIPTION

The present application discloses circuitry for idling a processor and a simplification of the idling procedure with respect to the prior art. The straight-forward processor idling circuitry of the present application is much less complex than the prior art idle detection circuitry and therefore reduces the risk of making an error in the design that may cause the processor to incorrectly indicate when it is idle. It is also designed to avoid the undesirable situation of stopping a clock and being unable to restart it again, which can result from complex detection circuitry. Typically, the present application can be used to minimize power consumption during certain circuit conditions, such as when the user has not provided any input for an extended period of time or when the processor has not been operating on any critical tasks for an extended period.

Figure 3:
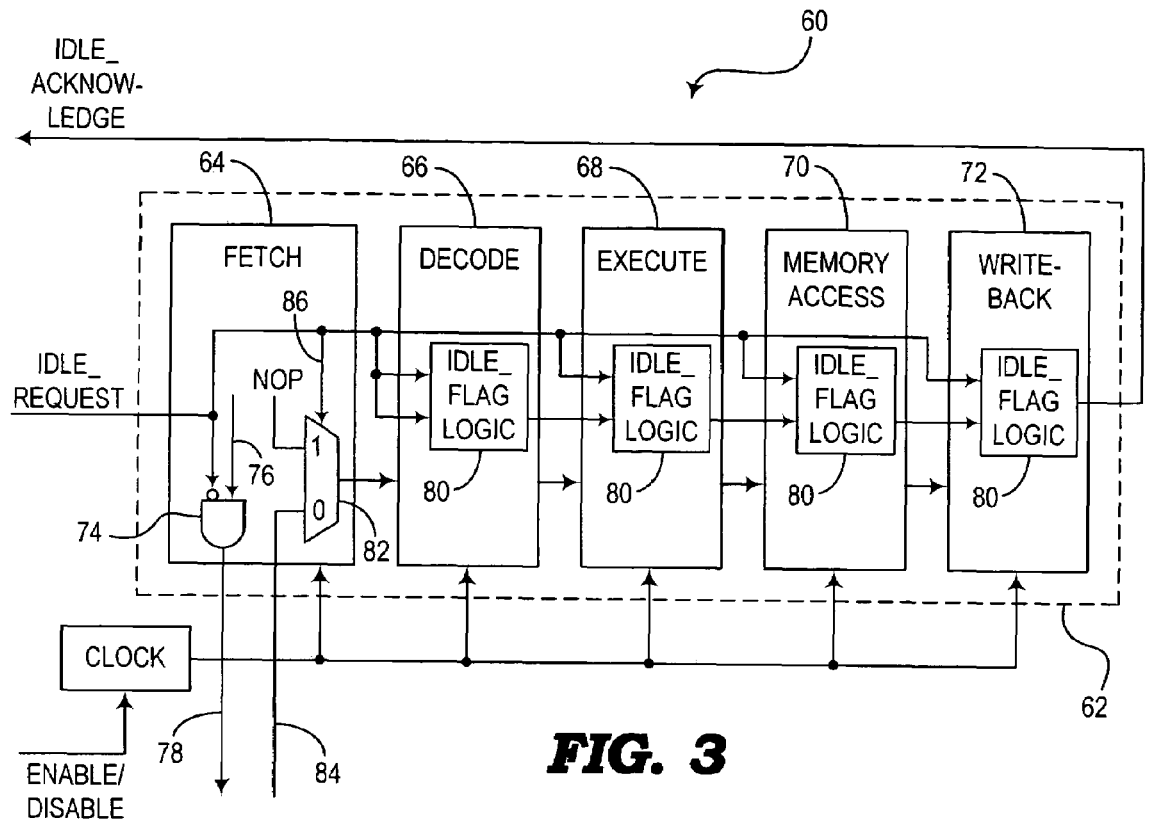
FIG. 3 is a schematic block diagram of an embodiment of a processor with improved idling circuitry.

FIG. 3 is a schematic block diagram of an embodiment of a processor 60 that may be incorporated into an electronic device, such as a battery-operated or hand-held device, e.g. an electronic notebook, personal digital assistant (PDA), cellular telephone, laptop computer, etc. This embodiment includes unique circuitry for idling the processor 60 in response to an idle_request from power management logic. The processor 60 comprises a processor pipeline 62 having five stages—a fetch stage 64, a decode stage 66, an execute stage 68, a memory access stage 70, and a write-back stage 72. Although the processor 60 as shown has five stages, it should be noted that other processor embodiments may include a design having any number or type of stages. One of ordinary skill in the art will recognize that the concepts presented herein may apply to a processor having any number of stages. In fact, it will become apparent that the concepts described in the present disclosure will greatly simplify the design of any processor, especially one having a large number of stages.

Figure 1:
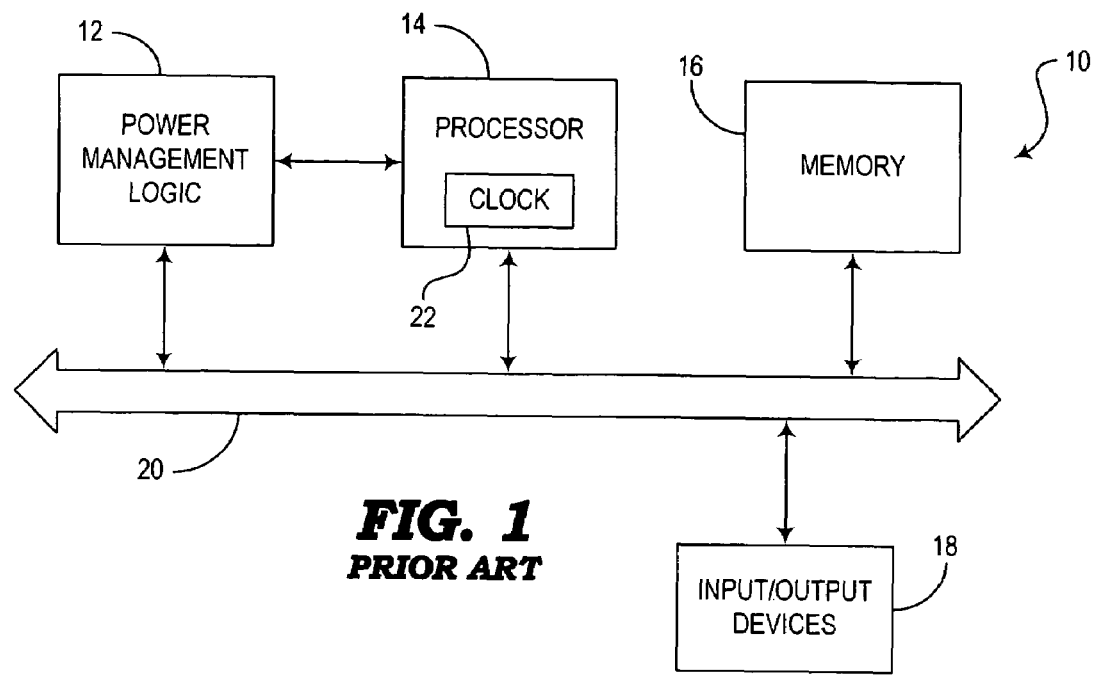
FIG. 1 is a block diagram of a conventional processing system of an electronic device.
Figure 2:
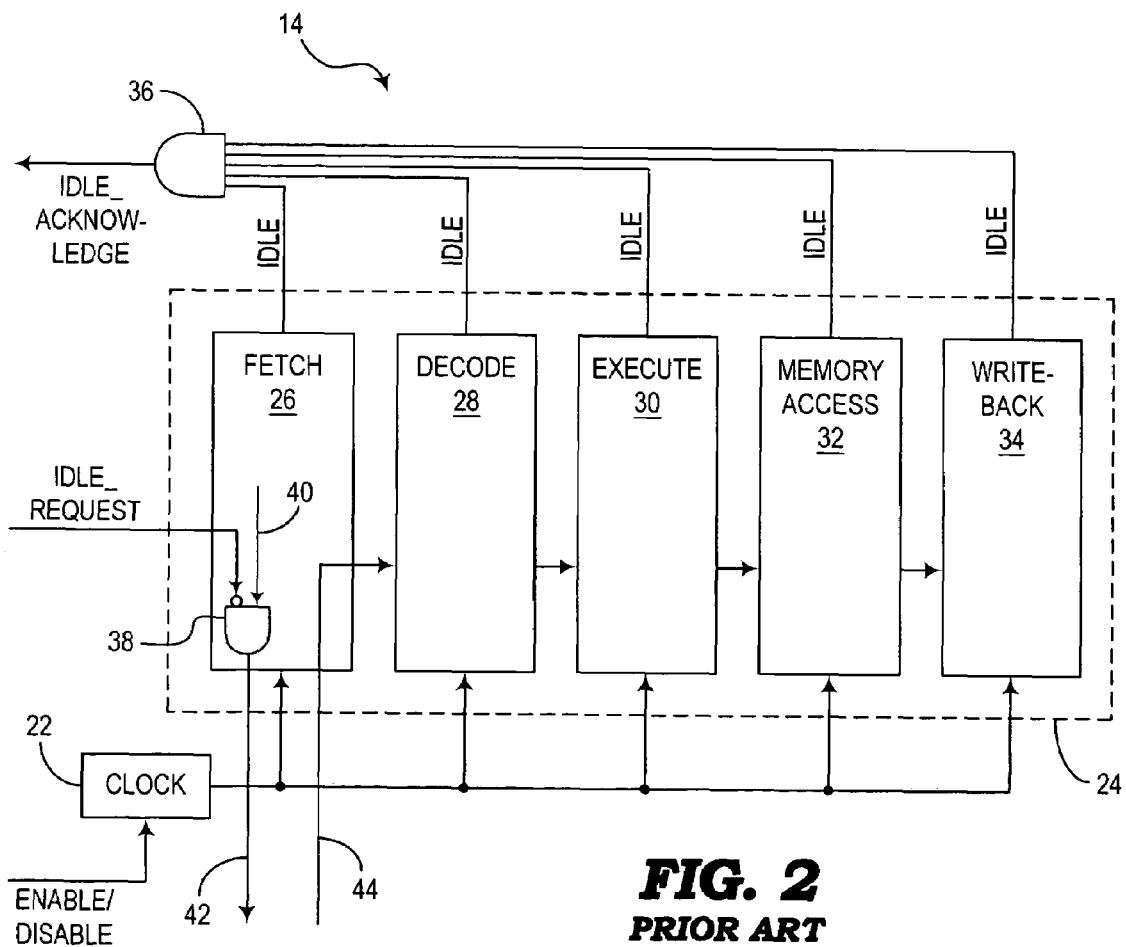
FIG. 2 is a schematic block diagram of a conventional processor.

The first stage, i.e. the fetch stage 64 in the embodiment of FIG. 3, includes an AND gate 74 having its inputs connected to receive an "idle_request" signal from the power management logic and a normal instruction request from internal line 76. The AND gate 74 outputs instruction requests along line 78 when the idle_request signal is inactive and is refrained from making requests when idle_request is high, similar to the manner in which the AND gate 38 operates as described above with respect to FIG. 2. The present embodiment, however, includes additional circuitry for idling the processor pipeline 62 in a greatly simplified and more consistent manner, without requiring each individual stage to include unique idle detection circuitry for detecting an idle state on its own.

In addition, the fetch stage 64 includes a multiplexer 82 having first and second inputs. The first input receives the instruction values from memory along line 84 and the second input receives a "no operation" (NOP) signal that is intended to indicate when the processor 60 is not operating on any new instructions. The multiplexer's selection input 86, which is connected to receive the idle_request signal, selects either the first or second input. During normal processor operation, the idle_request signal is inactive (logic 0) and the multiplexer 82 outputs the received instruction values from line 84 to the next stage. When processor idle is requested and idle_request is high, the selection input 86 causes the multiplexer 82 to output the NOP signal. The multiplexer 82 helps the processor 60 go idle quicker since it is configured not to take any new instructions and does not have to wait for outstanding instructions to come back from memory. It should be noted that the multiplexer 82 may be replaced with other combinations of logical components to accomplish the same functions as mentioned herein.

The NOP signal is transmitted through the remaining stages of the processor 60 and decoded, executed, etc., in such a way that each stage can determine that the processor is in a "no operation" mode. The NOP signal typically represents a NOP instruction in the fetch stage. As this NOP instruction propagates down the pipeline 62, it will cause the output control signals of each stage to be inactive, resulting in no operation being performed by the stages in association with the NOP signal. Each stage may require a different number of clock cycles before it is able to accept the NOP signal accordingly. The significance of this will become apparent with the discussion of the select_next_instruction signal mentioned below.

Figure 4:
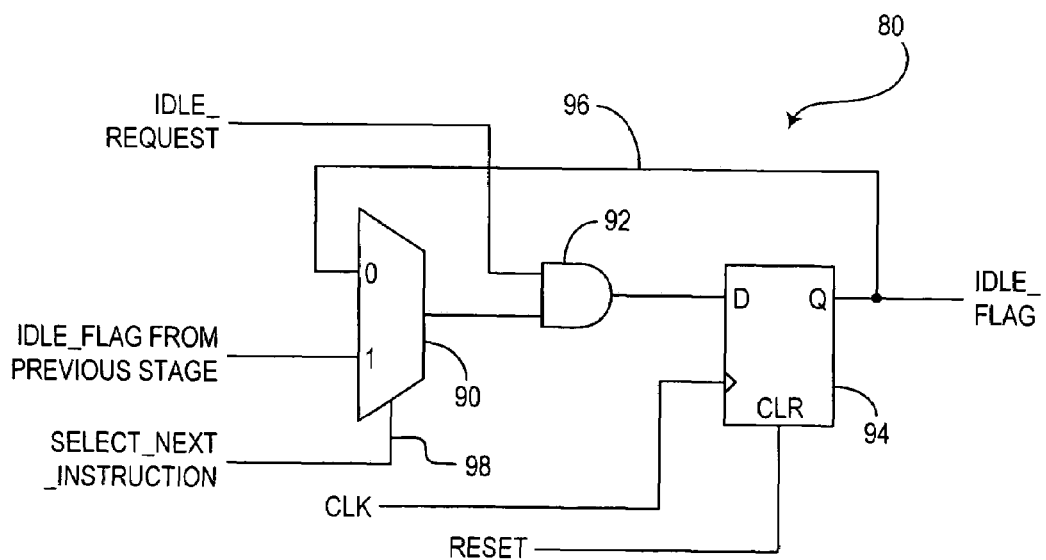
FIG. 4 is a schematic diagram of an embodiment of the idle_flag logic shown in FIG. 3.

Referring again to FIG. 3, the processor 60 comprises idle_flag logic 80 located within the decode stage 66, execute stage 68, memory access stage 70, and write-back stage 72. Although not necessary in this embodiment, idle_flag logic can also be included in the first stage, i.e. the fetch stage 64. Each stage's idle_flag logic 80, described in more detail below with respect to FIG. 4, is designed to forward an "idle_flag" signal to the idle_flag logic 80 of the next stage to pass the flag down the pipeline 62. The processor 60 also includes communication lines that couple the idle_request signal to each idle_flag logic 80 in each stage.

It should be noted that the idle_flag logic 80 in the second stage, i.e. the decode stage in this embodiment, does not receive an idle_flag from a previous stage's idle_flag logic since the first stage does not normally include this logic. Therefore, the idle_flag logic 80 in the second stage has its input to receive the idle_flag from the previous stage coupled to receive the idle_request signal. Therefore the idle_request signal in this stage is received at both an idle_request input and at the input from the previous stage's idle_flag, as will become more easily understood with reference to the description below.

FIG. 4 is a schematic diagram of an embodiment of the idle_flag logic 80 as shown in FIG. 3. The idle_flag logic 80 comprises a multiplexer 90, an AND gate 92, and a D-type flip-flop 94. The multiplexer 90 has a first input connected to receive a feedback signal along line 96 from the output of the flip-flop 94 and a second input connected to receive an idle_flag from the previous stage. The multiplexer 90 also includes a selection input for receiving a signal along line 98 that selects between the first and second inputs. The AND gate 92 has a first input that receives the idle_request signal and a second input connected to the output of the multiplexer 90. The flip-flop 94 has an input that is connected to the output of the AND gate 92 and also clock and reset inputs. The output of the flip-flop 94 is the "idle_flag" signal, which is sent to the idle_flag logic of the next stage.

A select_next_instruction signal is input as the selection input of the multiplexer 90 to indicate when a new instruction can be processed. The select_next_instruction signal will be high for clock cycles when a new instruction may be clocked into the stage. As a result, the select_next_instruction helps to synchronize the NOP signal with the idle_flag throughout the pipeline 62, guaranteeing that the NOP signal and the idle_flag propagate through each stage at the same time. In this regard, if a present instruction takes three clock cycles in a given stage, for example, then the next instruction can only be processed by that stage during the fourth clock period when the select_next_instruction signal is high during the third clock period.

The operation of the idle_flag logic 80 of FIG. 4 will now be described. During normal operation when the processor 60 is not idle, idle_request will be low at the input to AND gate 92, thereby resulting in an inactive idle_flag at the output of the flip-flop 94. The inactive flag is fed back to the multiplexer 90 and the low flag signal is held indefinitely in a loop in the idle_flag logic 80. In this case, the processor 60 continues to operate in a normal mode.

When a request to idle the processor 60 is being made, however, the power management logic sends a logic 1 idle_request signal. In the decode stage's idle_flag logic 80, not only does the AND gate 92 receive the idle_request, but also the "1" input of the multiplexer 90 is connected to receive the idle_request signal as well. In a slightly different configuration, the remaining stages have their multiplexer's "1" input connected to receive the idle_flag from the previous stage, as illustrated. The AND gate input from the multiplexer 90 will initially be low, but it receives a high signal from the multiplexer 90 when the "1" input is selected by the select_next_instruction signal when that stage finishes processing the current instruction. In this respect, the flag from the previous stage is allowed to be output from the multiplexer 90. At this point, the AND gate 92 outputs a high signal to the flip-flop 94 and the idle_flag signal is held high at the output of the idle_flag logic 80 to relay the idle_flag through the stages. When the flag reaches the last stage, i.e. the write-back stage in this embodiment, the flag is sent as the idle_acknowledge signal back to the power management logic. At this point, the power management logic, informed that the processor is properly idled, can then disable the clock. The idle_flag logic 80 maintains a high idle_flag at its output until idle_request goes low.

Although FIG. 4 represents the best mode for configuring logic to relay a flag to the next stage, it should be evident to one of ordinary skill in the art that the logic circuit may be created with different components and/or configurations. Since the embodiment of FIG. 4 is merely an example of possible logic circuits for passing an idle_flag down the pipeline, other embodiments of logic circuits having essentially the same function may be contemplated that fall within the spirit and scope of the present application.

Figure 5:
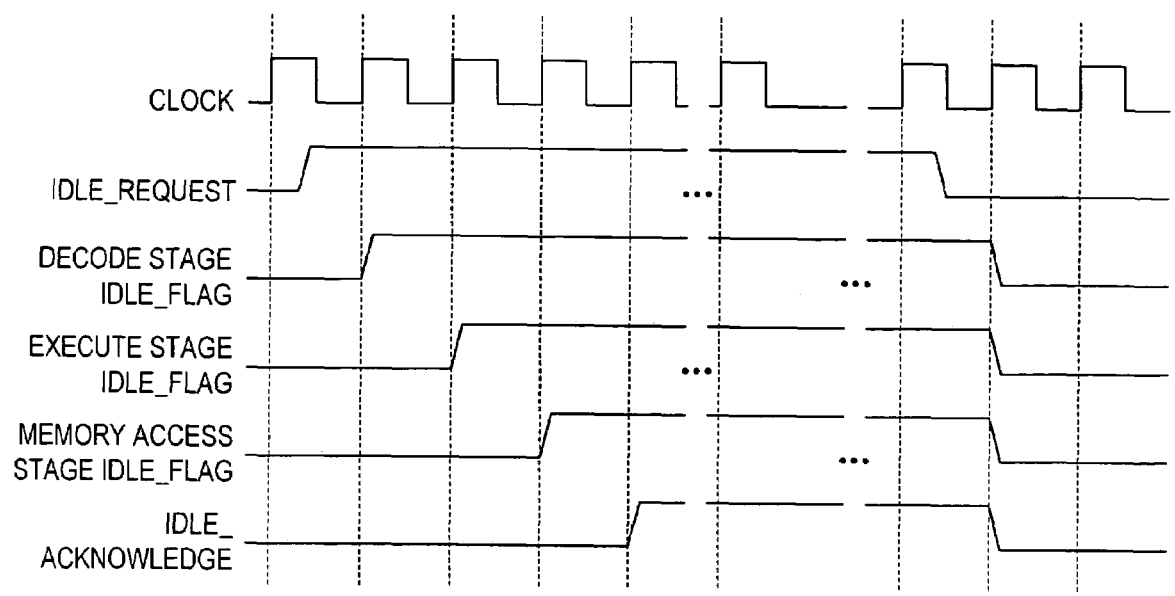
FIG. 5 is a timing diagram of signals propagating through the processor of FIG. 3 when an idle_request is made.

FIG. 5 is a timing diagram showing an example of signals within the processor 60 when a request is made to idle the processor 60. The top signal represents the clock signal having a predetermined frequency. When the idle_request goes high, the decode stage idle_flag goes high on the next clock cycle. One clock cycle later, the execute stage idle_flag goes high and one clock cycle after that the memory access stage idle_flag goes high. Then the write-back stage outputs its flag, indicated as the idle_acknowledge signal, which goes high on the next clock cycle. After the idle_flag has been transmitted through the entire pipeline and the idle_acknowledge goes high, some time will pass, as represented by the broken timeline, during which the power management logic goes through the process of shutting off the clock. The constant low clock signal in the diagram illustrates when the clock is off. Then, after an indefinite amount of time, as indicated by the second break in the timeline, the power management logic may detect an event that requires the processor to wake up, such as when the user provides an input. At this time, the power management logic re-enables the clock to turn it back on and drives idle_request low. The diagram of FIG. 5 also shows that each stage drops its idle_flag low on the next clock cycle after idle_request goes low.

Although FIG. 5 shows each stage responding one clock cycle after the previous stage, this response time assumes, however, that there is no delay in the processing of the NOP signal. With a delay, as is normally to be expected, the signals would merely be shifted in time the number of clock cycles necessary to process the NOP signal. The idle_flag in each stage may not go high until two or more clock cycles have passed, depending on when select_next_instruction goes high to signal the acceptance of the NOP signal into the stage. Therefore, with this setup, the idle_flag and NOP signal will synchronously flow through the pipeline in parallel.

Figure 6:
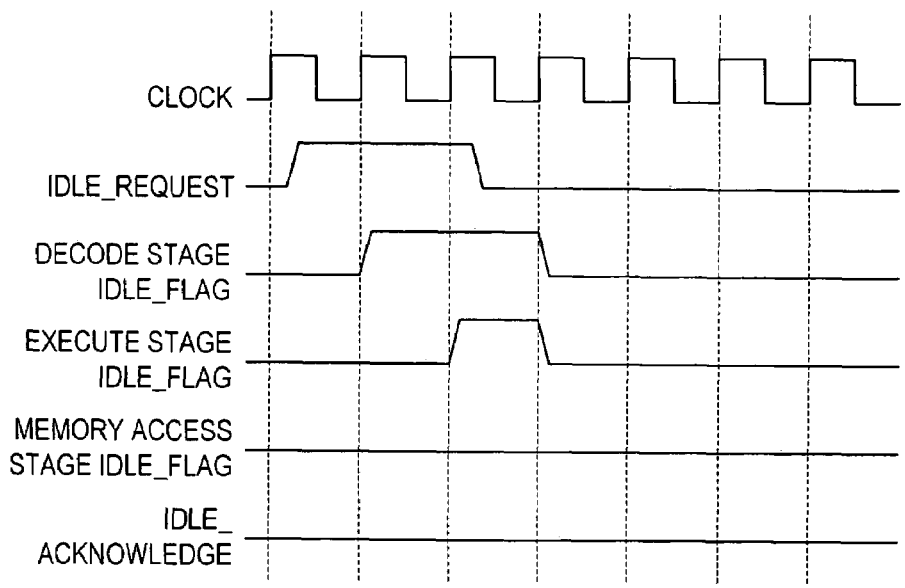
FIG. 6 is a timing diagram of signals propagating through the processor of FIG. 3 when an idle_request is made and subsequently interrupted.

FIG. 6 is a timing diagram illustrating a condition in which an idle_request is made, but the power management logic disables the idle_request before the processor is fully idled. This is an unusual situation that would probably occur only rarely. However, it must be entertained in order to avoid unacceptable behavior, such as the locking up of the processor or its clock. In this example, idle_request goes high and one clock cycle later, or longer if necessitated by select_next_instruction, the decode stage's idle_flag goes high. Then one clock cycle later the execute stage sends out its idle_flag. However, before the memory access stage receives the previous idle_flag to forward its own flag, the idle_request signal is disabled. This results in a low signal at the input and output of the AND gate 92 (FIG. 4) to drive the idle_flag low. By disabling the idle_request, the idle_flag in each stage is dropped low and normal operation continues without interrupting the operation of the clock.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:
1. A battery-operated electronic device comprising:
an internal bus;
a processor in electrical communication with the internal bus, the processor comprising:
a clock for providing clocking signals; and
a pipeline having a fetch stage, a decode stage, an execute stage, a memory access stage, and a write-back stage;
a memory device in electrical communication with the internal bus;
at least one input/output device in electrical communication with the internal bus; and
power management logic in communication with the processor, the power management logic configured to enable or disable the clock;
wherein the fetch stage comprises a first multiplexer for outputting a no-operation (NOP) signal when the fetch stage receives an idle_request signal from the power management logic and for outputting to the decode stage instruction values from the memory device when no idle_request signal is received; and
wherein at least the decode stage comprises idle_flag logic for forwarding an idle_flag signal through the pipeline.

2. The electronic device of claim 1, wherein the idle_flag logic comprises:
a second multiplexer;
an AND gate having a first input connected to an output of the second multiplexer; and
a flip-flop having an input connected to an output of the AND gate and having an idle_flag output connected to a zero input to the second multiplexer, the idle_flag output configured to transfer the idle_flag signal to a next stage of the pipeline;
wherein a one input to the second multiplexer is connected to receive the idle_flag signal from a previous stage.

3. The electronic device of claim 2, wherein the decode stage, execute stage, memory access stage, and write-back stage each comprise idle_flag logic.

4. The electronic device of claim 2, wherein the one input to the second multiplexer of the idle_flag logic of the decode stage is configured to receive the idle_request signal.

5. The electronic device of claim 2, wherein the idle_flag signal output from the write-back stage is transmitted as an idle_acknowledge signal to the power management logic.

6. The electronic device of claim 5, wherein, when the power management logic receives the idle_acknowledge signal, the power management logic disables the clock.

7. A processor comprising:
a clock configured to drive clock signals;
a processor pipeline having a plurality of stages; and
processor idling circuitry configured as idle_flag logic within two or more stages of the processor pipeline, the idle_flag logic of each stage responding to an idle_request signal;
wherein a first stage comprises means for stopping incoming instruction values from being further processed when the idle_request signal is received; and
wherein in response to receiving the idle_request signal, the idle_flag logic of each stage is configured to transmit an idle_flag signal through the processor pipeline.

8. The processor of claim 7, wherein the stopping means is a multiplexer comprising first and second inputs, a selection input, and an output, the first input configured to receive instruction values from a memory device, the second input configured to receive a "no-operation" (NOP) signal, and the selection input configured to receive the idle_request signal.

9. The processor of claim 8, wherein the idle_flag signal and the NOP signal flow through the pipeline in parallel.

10. The processor of claim 8, wherein the idle_flag signal and the NOP signal synchronously flow through the pipeline.

11. The processor of claim 7, wherein the idle_flag logic comprises:
a multiplexer;
an AND gate having a first input connected to an output of the multiplexer; and
a flip-flop having an input connected to an output of the AND gate and having an idle_flag output for providing the idle_flag signal, the idle_flag output connected to a zero input to the multiplexer;
wherein a one input to the multiplexer is connected to receive the idle_flag signal from a previous stage.

12. A method for idling a processor having a plurality of stages, the method comprising:
receiving an idle_request from power management logic;
blocking instruction values received from memory and propagating a "no-operation" signal through the stages of the processor; and propagating an idle_flag in parallel with the no-operation signal through the stages of the processor.

13. The method of claim 12, wherein propagating the idle_flag comprising passing the idle_flag through idle_flag logic located in at least two stages.

14. The method of claim 12, further comprising:
receiving the idle_flag in a last stage; and
outputting an idle_acknowledge signal.

15. The method of claim 14, further comprising:
transmitting the idle_acknowledge signal to the power management logic; and
receiving from the power management logic a disable signal for turning off the clock.

16. The method of claim 15, further comprising:
re-enabling the clock and driving the idle_request inactive when a wake-up event occurs.

17. A system for idling a processor, the system comprising:
means for receiving an idle_request from power management logic;
means for blocking the processor from receiving instruction values from memory and propagating a "no-operation" signal through stages of the processor; and
means for propagating an idle_flag in parallel with the no-operation signal through the stages of the processor.

18. The system of claim 17, wherein the means for propagating the idle_flag comprises idle_flag logic located in each of the stages.

19. The system of claim 17, further comprising:
means for receiving the idle_flag in a last stage; and
means for outputting an idle_acknowledge signal.

20. The system of claim 19, further comprising:
means for receiving from the power management logic a disable signal for turning off a clock that provides clocking signals to the processor.

21. The system of claim 20, further comprising:
means for re-enabling the clock and disabling the idle_request when a wake-up event occurs.

22. The system of claim 17, wherein the means for blocking comprises a multiplexer.

23. A logic circuit residing in a stage of a processor, the logic circuit comprising:
a multiplexer;
an AND gate having a first input connected to an output of the multiplexer;
a flip-flop having an input connected to an output of the AND gate and having an idle_flag output connected to a zero input to the multiplexer;
wherein a one input to the multiplexer is connected to receive an idle_flag signal from a previous stage.

24. The logic circuit of claim 23, wherein the multiplexer further comprises a selection input responsive to a select_next_instruction signal.

25. The logic circuit of claim 24, wherein the logic circuit is configured to forward the idle_flag signal from the previous stage to a next stage when a next instruction is received.

26. The logic circuit of claim 23, wherein the AND gate further comprises a second input connected to receive an idle_request signal.

27. The logic circuit of claim 26, wherein the flip-flop provides a logic low signal on the idle_flag output when the idle_request signal is driven low.

* * * * *